United States Patent [19]

Holmberg

[11] 4,295,751
[45] Oct. 20, 1981

[54] THREAD STRUCTURE FOR PERCUSSION DRILL ELEMENTS

[75] Inventor: John M. Holmberg, Selcourt Springs, South Africa

[73] Assignee: Boart International Limited, Johannesburg, South Africa

[21] Appl. No.: 77,549

[22] Filed: Sep. 21, 1979

[30] Foreign Application Priority Data

Sep. 21, 1978 [ZA] South Africa ................... 78/5370

[51] Int. Cl.³ ............................................. F16B 7/00
[52] U.S. Cl. ................................... 403/306; 403/307; 403/343; 285/334; 285/390; 411/411
[58] Field of Search ................. 403/306, 307, 343; 285/334, 355, 390; 85/46

[56] References Cited

U.S. PATENT DOCUMENTS

| Re. 27,284 | 2/1972 | Hjalsten et al. | 403/343 |
| 3,645,570 | 2/1972 | Johansson et al. | 403/307 |
| 3,717,368 | 2/1973 | Czarnecki et al. | 403/343 |
| 3,822,952 | 7/1974 | Johansson et al. | 403/343 |
| 4,040,756 | 8/1977 | Donegan | 403/343 X |
| 4,084,829 | 4/1978 | Fälchle et al. | 403/343 X |

OTHER PUBLICATIONS

*Engineering and Mining Journal*, vol. 161, No. 5, May 1960, p. 98–101, Anderson, Floyd "43 Years of Progress in Drill-Steel Thread Design".

*Primary Examiner*—James Kee Chi
*Attorney, Agent, or Firm*—Oblon, Fisher, Spivak, McClelland & Maier

[57] ABSTRACT

A coupling thread structure for percussion drill elements including a rod (10) having an external thread (14), and a sleeve (24) having an internal thread (26) with the threads, when the sleeve and rod are coupled, having abutting (16) and non-abutting (18) flanks and with the flanks being joined by bottom (22) and crest (20) portions, wherein the threads have at least two starts; the abutting flanks (16) are substantially straight along their whole abutting contact portions (CL) and form an angle of between 10° and 25°, preferably 15° to 20°, with the drill axis; the pitch angle of the threads is in the range 9° to 20°, preferably 11° to 16°; the crest portions (20) are substantially straight and intersect the abutting flank (16) portions at a well defined edge (30); the non-abutting flanks (18) have a flank angle which is considerably greater than that of the abutting flanks (16); the flank angle of the non-abutting flanks (18) is in the range 50° to 80°, preferably 65° to 75°, with respect to the drill axis; and the bottom portions (22) of the threads (14,26) are curved.

20 Claims, 5 Drawing Figures

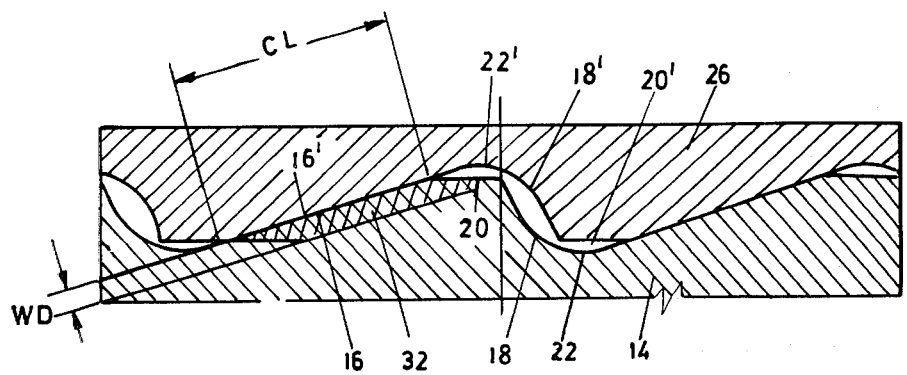
FIG_4
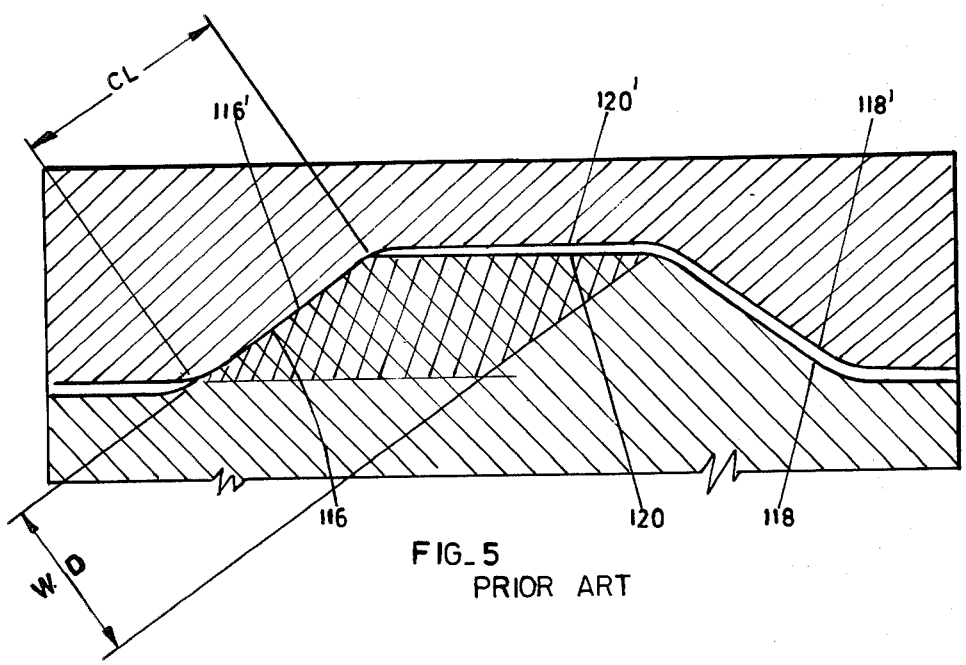
FIG_5
PRIOR ART

THREAD STRUCTURE FOR PERCUSSION DRILL ELEMENTS

BACKGROUND OF THE INVENTION

This invention relates to thread structures and more particularly to a cylindrical thread structure for use on percussion drilling parts, such as drill strings, which are also rotated.

Such thread structures must provide a firm connection between the elements so that drill rods are not lost down holes and provide a sufficiently tight joint to transfer the drilling impact from rod-striker face to butting rod striker face with best possible efficiency while at the same time should allow the thread to be unscrewed easily. Percussion drilling methods have developed the need for more powerful drilling machines with the resulting higher drilling torque. Many drill units, especially of the percussion variety, utilise threaded connections between the drill rod elements which consist of two or more aligned drill rods with a coupling sleeve. Many drilling methods effect a tightening of the threaded drill elements during use, especially in percussion drilling operations. The torque required for separation of the elements should not be too large for stripping, that is be too difficult to separate the elements after a high torque application which has been applied simultaneously with a percussive load. A further problem with such coupling threads is that they must have an acceptable wearing life.

The uncoupling torque and coupling torque are usually related to each other and among other things depend on the materials used, hardness of the contacting thread surfaces, the angle of the abutting threads and the pitch of the thread. In general the uncoupling torque increases as the pitch and flank angles decrease. U.S. Pat. No. Re. 27,284 proposes a thread structure to minimise uncoupling torque when the threads have symmetrical abutting and secondary flanks which are arcuate and have a maximum flank angle with respect to the drill rod axes adjacent the rod thread crests in the range 45°–20° and preferably 40°–30° which decreases a zero at the bottom of the thread, has two or more starts and, consequently, has a pitch or lead angle of 5°–14°, preferably 7°–11°, and the crests of the threads are substantially flat. According to the patent these straight crests ensure that the contact between the matching thread surfaces adjacent the crests of the rod thread is established only at portions of the thread having an angle of inclination to the axis which is substantially different from 0° so that wedging does not occur. It is believed that because of the use of two or more starts whereby a greater pitch angle can be employed than was usual at the date of invention of that patent some decrease of the uncoupling torque could be obtained. However, it seems that the varying flank angles counteracts this effect to some extent. Also it is believed that the wear life of the coupling was not improved because of the thread profile which does not maximise the area of the contacting surfaces or minimise the contact pressures. Also the thread profile does not make full use of the hardened surfaces of the coupling structure, which is usually 0.7 to 1.4 mm thick and much wear would take place in the relatively softer, un-hardened material of the coupling. Finally, the thread structure does not allow for the weight of the coupling sleeve to be decreased even though it is known that the wear rate increases as the weight of the coupling sleeve increases.

This invention seeks to provide a coupling structure which will satisfactorily meet the wearing life requirements of a user while at the same time have acceptable unlocking torque characteristics.

SUMMARY OF THE INVENTION

The invention provides a coupling thread structure for percussion drill elements including a rod having an external thread and a sleeve having an internal thread with the threads, when the rod and sleeve are coupled together, presenting abutting and non-abutting flanks, with the flanks being joined by crest and bottom portions and with the following characteristics:

the thread has at least two starts or entrances;

the abutting flanks are straight along their whole abutting contact portions;

the abutting flank portions form an angle or between 10° and 25° with the drill axis; and the pitch angle of the threads is between 9° and 20°. Currently available thread structures of this type normally have an abutting flank angle of between 25° and 40° with the drill axis and a pitch angle for the threads normally between about 5° and 11°, the higher pitch angles being used with two start threads, e.g. as especially mentioned in U.S. Pat. No. Re. 27,284. Thus it can be seen that the thread structure of this invention has an abutting flank angle much smaller than and a pitch angle which is much greater than currently used thread structures or disclosed prior art structures. As discussed below this larger pitch angle with a smaller flank angle results in an increased flank contact area which in turn produces a reduced pressure on the abutting flank contact areas so yielding a slower wear rate during drilling. At the same time the larger pitch angle and the smaller flank angle ensure that the unlocking torque is acceptable, and of the same order or less than currently available thread structures, while at the same time providing the desired self-locking characteristics which ensure that the drill string does not become unintentionally uncoupled during use.

Further features of the invention are that:

The angle which the abutting flank portions form with the drill axis are preferably between 15° and 25° and preferably less than 20°; the pitch angle is preferably between 9° and 16° and preferably greater than 11°;

The crest portions are straight and, conveniently, parallel to the drill axis though they may be inclined to the drill axis slightly, such as up to about 3°, in a direction from the abutting to non-abutting flanks;

At least one of, and preferably both of, the abutting and non-abutting flank portions intersect the crest portions at a well defined edge to facilitate machining;

The bottom portions are curved, preferably merge tangentially with the abutting and non-abutting flank portions, and have a radius of curvature which is greater than the depth of the thread, i.e. the radial distance between the crest portion and base of the bottom portion; and The internal and external threads i.e. on the coupling sleeve and drill rod are substantially similar, while being reflections of each other in one form. In another form of the invention the crest portion is made relatively longer on the rod than on the coupling i.e. height of crest portion of the thread on the rod from the drill axis, is less than the distance of the bottom portion of the thread on the coupling sleeve from the drill axis, so that the rod thread wear life will be greater than that of the coupling thread life.

According to the invention there is also provided a coupling thread structure for percussion drill elements including a rod having an external thread and a sleeve having an internal thread with the threads, when the sleeve and rod are coupled, having abutting and non-abutting flanks and with the flanks being joined by bottom and crest portions, wherein the threads have at least two starts or entrances; the abutting flanks are substantially straight along their whole abutting contact portions and form an angle of between about 10° and 25° with the drill axis; the pitch or lead angle of the threads is in the range 9° to 20°; the crest portions are substantially straight and intersect the abutting flank portions at a well defined edge; the non-abutting flanks have a flank angle which is considerably greater than that of the abutting flanks; and the flank angle of the non-abutting flanks is in the range 50° to 80° with respect to the drill axis.

Preferably the non-abutting flanks have a flank angle in the range 65° to 75°.

Further features and advantages of the invention will become apparent from the following description made with reference to the accompanying drawings.

BRIEF DESCRIPTION OF THE DRAWINGS

FIG. 4 shows a section through a part of a coupling thread structure of the invention; and FIG. 5 shows a section similar to that of FIG. 4, but of a prior art coupling thread structure.

DESCRIPTION OF PREFERRED EMBODIMENT

Figures 1, 2:
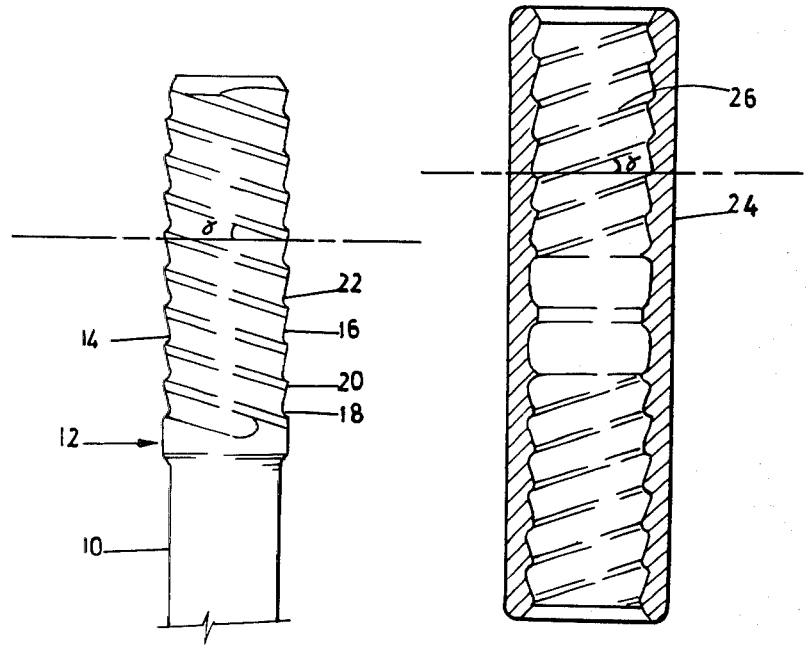
FIG. 1 shows a portion of a drill rod formed with a thread according to the invention.
FIG. 2 shows a coupling sleeve also formed with a thread of the invention for engaging the drill rod of FIG. 1.

FIG. 1 shows a portion of a drill rod 10 having a thread structure 12 according to the invention at its end. The thread structure 12 is in the form of an enlarged diameter portion of the rod formed with a two-entrance or two-start thread 14 with a pitch angle of 12.32°. As will be described in greater detail below the thread has an abutting flank portion 16, a non-abutting flank portion 18, a crest 20, and a bottom portion 22. FIG. 2 shows a coupling sleeve 24 engageable with the threaded portion 12 of the rod 10 and formed with internal threads 26. The internal threads 26 are similar in profile to the threads 14 of the drill rod but are reflections of those threads. The portions of the threads 26 which correspond with portions of the threads 14 will be denoted by the same reference numerals, but the numerals which refer to the threads 26 will bear a prime.

Figure 3:
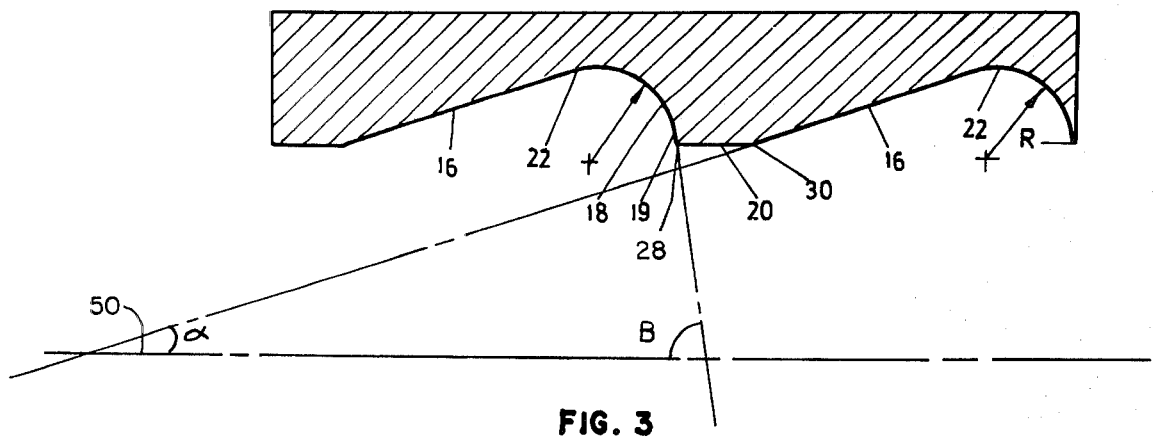
FIG. 3 shows, on an enlarged scale, a section through a portion of the coupling sleeve of FIG. 2 illustrating the thread profile in greater detail.

FIG. 3 shows the threads 26 of the coupling sleeve 24 in more detail. As can be seen the thread has a straight abutting flank portion 16' which merges tangentially with the curved bottom portion 22', which, in turn, merges with the non-abutting flank portion 18 that has a straight portion 19' at its radially inner end. The straight portion 19' meets the crest portion 22' at a well defined edge 28. The crest portion 20', which is straight and parallel to the drill axis 50, also meets the next abutting flank portion 16' at a well defined edge 30. As shown the bottom portion 22 is curved with the radius of curvature R being greater than the depth of the bottom portion, i.e. the radial distance between the crest portion 20' and the bottom of the curved portion 22'. In this example the abutting flank 16' makes an angle of 18.5° with the drill axis 50. The straight portion 19' of the non-abutting flank 18' forms an angle B of 71.5° with the drill axis 50.

FIG. 4 shows the rod thread portion 14 and the coupling sleeve thread portion 26 engaged with one another. As can be clearly seen there is a clearance formed between the respective crest portions 20, 20' and bottom portions 22, 22'. The abutting flanks 16, 16' are shown contacting one another, while the non-abutting flanks 18, 18' are spaced from one another. The length, measured along the abutting flank, of the contact between the abutting flanks 16, 16' is denoted "CL". Also shown is a hatched region 32 which represents the developed form of the thread after it has worn in service.

FIG. 5 shows a prior art coupling structure in which the same reference numerals as used previously are used, but with the prefix 100. The contact length "CL" of the abutting flanks 116 and the wear depth "WD" of the thread in service are also shown as was done in FIG. 4.

Below is a table giving a comparison for a 38 mm coupling thread between a prior art thread and a thread made according to the invention.

| 38 mm Coupling Thread | Thread Structure of Invention (FIGS. 1–4) | Thread Structure of Prior Art (FIG. 5) |
|---|---|---|
| Diameter:rod Max. | 38,10 mm | 38,10 mm |
| Sleeve Min | 34,10 mm | 34,10 mm |
| Clearance = $\frac{\text{rod max.} - \text{sleeve min}}{2}$ | 2,0 mm | 2,0 mm |
| Number of Starts | Two | Single |
| Pitch | 25 mm | 15,63 mm |
| Pitch Angle $\gamma$ | 12,32° | 7,85° |
| Flank Angle $\alpha$ | 18,5° | 35° |
| Contact Length (CL) | 6,30 mm | 3,49 mm |
| Wear Depth Max. (WD) | 0,73 mm | 2,5 mm |
| Total contact area per 100 mm of thread length | 58,53 cm$^2$ | 25,56 cm$^2$ |
| Wear Volume | 3,42 cm$^3$ | 5,05 cm$^3$ |

From the table above it will be appreciated that the following features emerge.

Firstly with the thread structure of the invention there is a reduced pressure in the abutting flank surface contact area. This reduced pressure will result in a slower wear rate during drilling compared with the prior art structure. The relation between surface pressure and wear rate is not known, but judging from experience, the wear rate should be retarded more than the proportional difference.

Secondly with the prior art thread structure, the wear depth is 2.5 mm which is comparatively large. If a carburizing and hardening process is used for making the threads, the case depth normally is 1.0 to 1.4 mm and when compared with the wear depth of 2.5 mm one can see that the latter part of the wear life will be spent in the softer core with a relatively higher wear rate. On the other hand the wear depth with the thread structure of the invention is only 0.73 mm with the design given above; thus the whole wear life is spent inside the effective case hardened zone which should give a much slower wear rate. An added feature in this case is the lesser deformation of the wear surfaces during the surface life of the thread structure which means better matching when components at different stages of wear are used together.

Thirdly as will be appreciated by persons skilled in the art, the thread structure of the invention will not loosen during drilling, while at the same time the coupling would still be satisfactorily easy to uncouple when desired.

Fourthly, an advantage of the new thread structure of the invention is that the wear life, which is very much related to the flank surface loading, can be selected to match the rod fatigue life, while still maintaining the desired locking and unlocking properties. In practice the thread wear life should not be increased into the range of the rod fatigue life so that in a proper design the rod can be discarded after a pre-selected amount of wear of the thread structure which will occur before the rod reaches the end of its life. In other words the rod should not break in service.

Finally, the use of a relatively large flank angle for the non-abutting flanks 18, 18' provides a number of advantages. One is that it permits the pitch to be varied as desired within a broad range of pitch and flank angles. Another is that it decreases the volume of metal actually involved in the threads so that the weight of the coupling can be reduced. The use of this large non-abutting flank angle does not decrease the strength of the coupling in any way since with the relatively small abutting flank angle most of the forces on the threads are radial and not axial. Also, since the non-abutting flank plays no part in the coupling, the fit or guidance of the sleeve on the rod is unaffected. Another feature of this relatively larger flank is that it assists in visually distinguishing the thread structure of the invention from other thread structures which may happen to be in use at the same location.

As will be appreciated by persons skilled in the art many changes may be made to the thread structure of the invention without departing from the spirit or principles of this invention. For example, the precise angles for the pitch and flanks can be varied. Also the nominal rod diameter can be chosen as desired. Also the thread structure can be used between a drill rod and a drill bit. Accordingly, the embodiment specifically described above with reference to the drawings is to be regarded as illustrative and not limiting.

I claim:

1. A coupling thread structure for percussion drill elements including a rod having an external thread and a sleeve having an internal thread with the threads, when the rod and sleeve are coupled together, presenting abutting and non-abutting flanks and with the flanks being joined by crest and bottom portions, wherein the thread has at least two starts; the abutting flanks are straight along their whole abutting contact portions; the abutting flank portions form an angle of between 10° and 25° with the drill axis; and the pitch angle of the threads is between 9° and 20°.

2. A structure as claimed in claim 1, wherein the flank angle of the abutting flanks is between 15° and 25°.

3. A structure as claimed in claim 1, wherein the flank angle of the abutting flanks is less than 20°.

4. A structure as claimed in claim 1, wherein the pitch angle is between 9° and 16°.

5. A structure as claimed in claim 1, wherein the pitch angle is greater than 11°.

6. A structure as claimed in claim 1, wherein the crest portions are straight.

7. A structure as claimed in claim 1, wherein the crest portions are straight and inclined towards the drill axis by between 0° and 3° in a direction from the abutting flanks to the non-abutting flanks.

8. A structure as claimed in claim 1, wherein the abutting flanks intersect the crest portions at a well defined edge.

9. A structure as claimed in claim 1, wherein the non-abutting flanks intersect the crest portions at a well defined edge.

10. A structure as claimed in claim 1, wherein the bottom portions are curved and merge tangentially with the abutting and non-abutting flanks.

11. A structure as claimed in claim 10, wherein the radius of curvature of the bottom portions is greater than the depth of the thread.

12. A structure as claimed in claim 1, wherein the internal and external threads on the coupling sleeve and rod, respectively, are substantially similar.

13. A structure as claimed in claim 1, wherein the height of the crest portion of the thread on the rod from the drill axis is less than the distance of the bottom portion of the thread on the coupling sleeve from the drill axis.

14. A structure as claimed in claim 1, wherein the angle which the non-abutting flank makes with the drill axis is greater than the flank angle of the abutting flanks.

15. A structure as claimed in claim 1, wherein the angle which the non-abutting flank makes with the drill axis is between 50° and 80°.

16. A structure as claimed in claim 1, wherein the angle which the non-abutting flank makes with the drill axis is between 65° and 75°.

17. A coupling thread structure for percussion drill elements including a rod having an external thread and a sleeve having an internal thread with the threads, when the sleeve and rod are coupled, having abutting and non-abutting flanks and with the flanks being joined by bottom and crest portions, wherein the threads have at least two starts; the abutting flanks are substantially straight along their whole abutting contact portions and form an angle of between 10° and 25° with the drill axis; the pitch angle of the threads is in the range 9° to 20°; the crest portions are substantially straight and intersect the abutting flank portions at a well defined edge; the non-abutting flanks have a flank angle which is considerably greater than that of the abutting flanks; and the flank angle of the non-abutting flanks is in the range 50° to 80° with respect to the drill axis.

18. A structure as claimed in claim 17, in which the flank angle of the non-abutting flanks is in the range 65° to 75°.

19. A structure as claimed in claim 17, wherein the flank angle of the abutting flanks is between 15° and 20°.

20. A structure as claimed in claim 17, wherein the pitch angle is between 11° and 16°.

* * * * *